(12) United States Patent
Zimmerman et al.

(10) Patent No.: US 10,110,863 B2
(45) Date of Patent: Oct. 23, 2018

(54) SPECKLE REDUCTION IN MULTI-LASER BEAM SCANNING DISPLAY

(71) Applicant: Microvision, Inc., Redmond, WA (US)

(72) Inventors: Dale Eugene Zimmerman, Redmond, WA (US); Matthieu Saracco, Redmond, WA (US); Jonathan A. Morarity, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 0 days.

(21) Appl. No.: 15/365,670

(22) Filed: Nov. 30, 2016

(65) Prior Publication Data

US 2018/0152680 A1    May 31, 2018

(51) Int. Cl.
*H04N 9/31*    (2006.01)

(52) U.S. Cl.
CPC .......... *H04N 9/3155* (2013.01); *H04N 9/317* (2013.01); *H04N 9/3129* (2013.01); *H04N 9/3161* (2013.01); *H04N 9/3164* (2013.01); *H04N 9/3167* (2013.01)

(58) Field of Classification Search
CPC ... H04N 9/3105; H04N 9/3129; H04N 9/3164
USPC ....... 348/760, 744, 745, 746, 747, 757, 756; 353/98
See application file for complete search history.

(56) References Cited

U.S. PATENT DOCUMENTS

| | | | | |
|---|---|---|---|---|
| 2003/0095251 | A1* | 5/2003 | Maeda ................. | G01N 21/956 356/237.2 |
| 2008/0253418 | A1* | 10/2008 | Egawa ................. | H01S 5/0683 372/38.02 |
| 2014/0320829 | A1* | 10/2014 | Woltman ............. | H04N 9/3129 353/98 |

* cited by examiner

*Primary Examiner* — Jefferey F Harold
*Assistant Examiner* — Jean W Desir
(74) *Attorney, Agent, or Firm* — Kevin D. Wills (57) ABSTRACT

A scanning projector includes one or more scanning mirrors that reflect a light beam to create an image. The beam is created by multiple laser light sources, at least two of which create light at substantially the same color. The multiple laser light sources are used alternately to illuminate successive pixels, lines, and/or frames. Speckle reduction is achieved because of spatial overlap of the light beams produced by the multiple laser light sources.

10 Claims, 10 Drawing Sheets

FIG. 3
POLARIZATION DIVERSITY

FIG. 4
WAVELENGTH DIVERSITY

FIG. 5
ALTERNATING PIXELS

FIG. 6
ALTERNATING LINES

FIG. 7
ALTERNATING FRAMES

SPECKLE REDUCTION IN MULTI-LASER BEAM SCANNING DISPLAY

FIELD

The present invention relates generally to projection systems, and more specifically to scanning projection systems.

BACKGROUND

Laser light reflected off a surface sometimes exhibits a sparkling phenomenon referred to as "speckle." Laser light is spatially coherent, and when reflected off a diffuse surface, the reflected coherent light waves interfere with each other in a regular pattern that results in a user perceiving speckle. Scanning projectors that utilize lasers for light sources may exhibit speckle across a displayed image.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
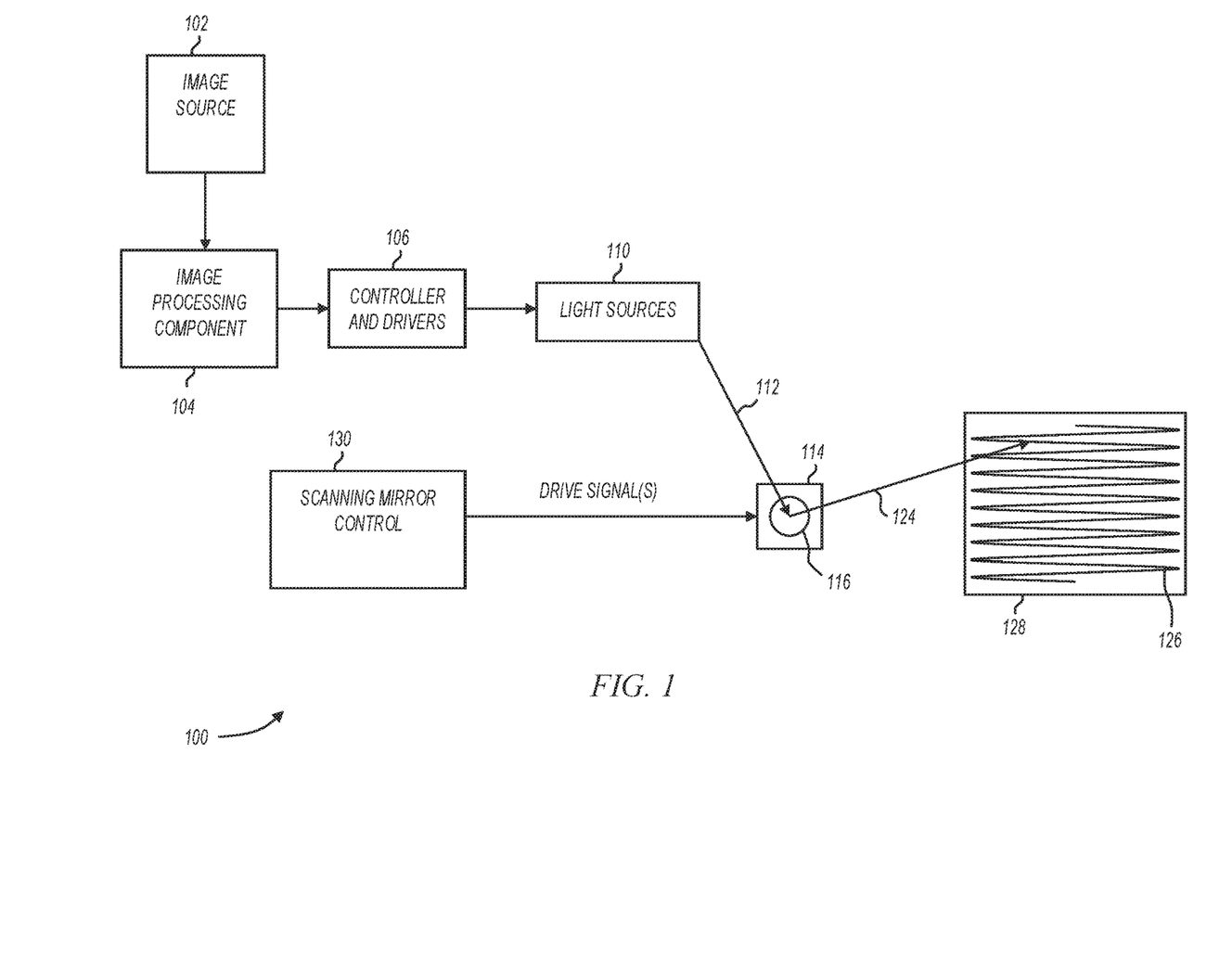
FIG. 1 shows a scanning projection apparatus in accordance with various embodiments of the present invention.

FIG. 1 shows a scanning projection apparatus in accordance with various embodiments of the present invention. As shown in FIG. 1, scanning projection apparatus 100 includes a light source 110 that includes multiple laser light sources capable of emitting a beam 112. The beam 112 impinges on a scanning platform 114 which includes a microelectromechanical system (MEMS) based scanner or the like, and reflects off of scanning mirror 116 to generate a controlled output beam 124. A scanning mirror control circuit 130 provides one or more drive signal(s) to control the angular motion of scanning mirror 116 to cause output beam 124 to generate a raster scan 126 on a projection surface 128.

In some embodiments, raster scan 126 is formed by combining a sinusoidal component on the fast-scan axis (horizontal axis) and a sawtooth component on the slow-scan axis (vertical axis). In these embodiments, controlled output beam 124 sweeps back and forth left-to-right in a sinusoidal pattern, and sweeps vertically (top-to-bottom) in a sawtooth pattern with the display blanked during flyback (bottom-to-top). FIG. 1 shows the fast-scan sinusoidal pattern as the beam sweeps vertically top-to-bottom, but does not show the flyback from bottom-to-top.

One raster scan from left-to-right or right-to-left is referred to herein as one "line," and one raster scan from top-to-bottom is referred to herein as one "frame." Pixels are painted along the raster scan in lines and frames as light sources 110 are modulated. Although the fast-scan axis is shown as the horizontal axis, and the slow-scan axis is shown as the vertical axis, the various embodiments of the present invention are not so limited. In some embodiments, the slow-scan axis is the horizontal axis and the fast scan axis is the vertical axis.

Image source 102 provides an image to be displayed to image processing component 104. Image source 102 may include a processor executing software or any type of hardware that can provide an image. For example, image source 102 may be a storage medium such as a memory device or a hard disk. Also for example, image source 102 may be a processor that forms an image while executing software instructions. In still further examples, image source 102 may be a connector or a communication medium that can receive communications that include an image to be displayed. The image provided to image processing component 104 may be static or may change over time. For example, the image source 102 may provide a video stream to image processing component 104.

Image processing component 104 receives an image from image source 102 and provides commanded light power values on a per-pixel basis to controller and drivers 106. Controller and drivers 106 drives the laser light sources 110 with the correct timing and intensity so as to reproduce the image as beam 124 traverses raster pattern 126. In some embodiments, controller and drivers 106 drives multiple laser light sources that produce light of substantially the same color. For example, laser light sources 110 may include two sources each of red, green, and/or blue laser light, and controller and drivers 106 may alternately drive them to illuminate alternate pixels, lines, or frames.

Using multiple sources of laser light of substantially the same color can reduce speckle. When multiple sources of laser light of the same color are driven at the same output power level, speckle is reduced by a factor of up to $$\frac{1}{\sqrt{n}},$$

where n is the number of laser light sources. The actual magnitude of speckle reduction depends on a number of factors.

Low electrical power consumption is an advantage of laser beam scanning displays. Laser diodes start lasing above a certain threshold current that corresponds to a non-zero voltage; hence, a minimum non-negligible electrical power consumption is required to make a laser diode start lasing. When using a system with two red, two green, and/or two blue laser light sources, only low optical power is required to display an image an image with low light content. When only one of two laser light sources is turned on, the speckle reduction of $$\frac{1}{\sqrt{2}}$$

cannot be achieved. Alternatively, if the required (low) optical power is split 50/50 between the two laser light sources of the same color (in order to project two orthogonally polarized beams on the screen with equal optical intensity), then the systems incur the lasing threshold power consumption twice, which is undesirable to maintain low power consumption.

Various embodiments of the present invention achieve speckle reduction using two laser light sources without incurring the added power consumption of two laser diode threshold currents by alternating the use of the two laser light sources.

One advantage of this alternating lasers technique is that the threshold electrical power consumption is only incurred for one laser light source and the speckle reduction of $$\frac{1}{\sqrt{2}}$$

is also achieved. This technique also has thermal advantages since the dissipated power in the device is lower. For high image contents that require both lasers to be turned on, the total required optical power can be shared evenly between the two lasers. Both lasers will incur the threshold electrical power consumption as they would regardless of the alternating lasers technique.

Figure 2:
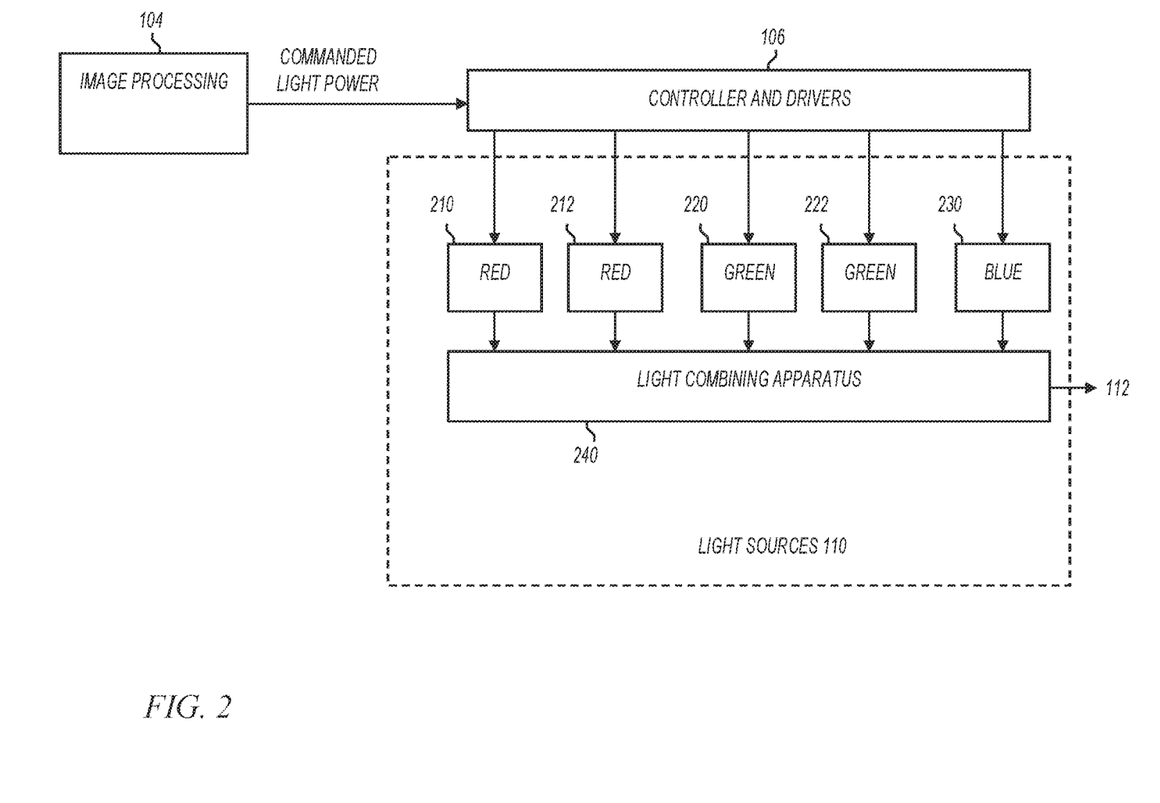
FIG. 2 shows multiple laser light sources that produce light of substantially the same color.

FIG. 2 shows multiple laser light sources that produce light of substantially the same color. As shown in FIG. 2, light sources 110 includes two red light sources 210, 212, two green light sources 220, 222, and one blue light source 230. Each of the light sources 210, 212, 220, 222, and 230 are driven by controller and drivers 106, and produce light in response thereto. For example, red light sources 210 and 212 produce red laser light in response to drive signals received from controller and drivers 106.

As used herein, the term "light of substantially the same color" refers to light that is perceived to be the same color by a human eye. For example, green laser light sources 220 and 222 produce light of substantially the same color. In some embodiments, they may produce light of exactly the same wavelength (e.g., 525 nanometers), and in other embodiments, the wavelength of the light from the two source may vary while still being in the "green" spectrum (e.g., 520-550 nanometers). In both cases, the two sources produce light of substantially the same color.

In operation, image processing component 104 produces commanded light power values for each of red, green, and blue light to illuminate each pixel, and provides these commanded light power values to controller and drivers 106. Image processing component 104 may include any suitable hardware and/or software useful to produce commanded light power values from video data. For example, image processing component 104 may include application specific integrated circuits (ASICs), one or more processors, or the like. In some embodiments, image processing component 104 determines the location of beam 124, and interpolates between pixels in a source image to determine luminance values for a pixel to be displayed on the raster pattern 126.

Controller and drivers 106 drives the multiple light sources in a manner that reduces speckle. For example, in some embodiments, two light sources of substantially the same color are alternately driven to illuminate successive pixels, and in other embodiments, two light sources of substantially the same color are alternately driven to illuminate successive lines or frames.

When two laser light sources of substantially the same color are alternately driven with equal power levels, speckle can be reduced by up to 0.707

$$(\frac{1}{\sqrt{n}}$$

with n=2). Controller and drivers 106 determines when to drive each laser light source and drives them accordingly.

In some embodiments, the laser light sources include laser diodes that are driven with electrical current. In these embodiments, the commanded light power values are converted to electrical currents by controller and drivers 106. Further, in some embodiments, controller and drivers 106 include digital-to-analog converters that convert digital commanded light power values to electrical currents that drive laser diodes.

Light combining apparatus 240 receives light from the various light sources shown and creates a single collimated beam at 112. Light combining apparatus 240 may include any suitable optical components, such as beam combiners, mirrors, and lenses.

Laser light sources 110 shows two red light sources, two green light sources, and one blue light source, although this is not a limitation of the present invention. For example, in some embodiments, light sources 110 includes two green light sources, and one each of red and blue light sources. In other embodiments, light sources 110 includes only two red or only two blue light sources.

Figure 3:
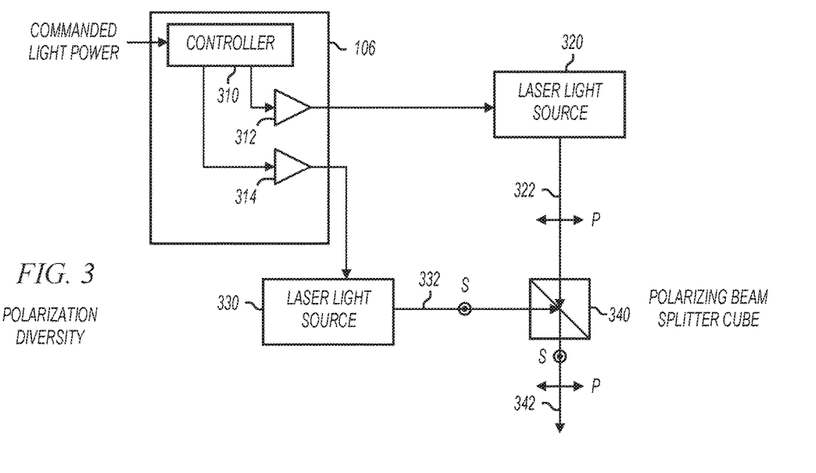
FIG. 3 shows a controller and drivers driving two laser light sources having different polarizations.

FIG. 3 shows a controller and drivers driving two laser light sources having different polarizations. Controller and drivers 106 is shown including controller 310 and drivers 312 and 314. Controller 310 receives commanded light power values and drives one or both of drivers 312 and 314. Driver 312 drives laser light source 320, and driver 314 drives laser light source 330.

Laser light sources 320 and 330 produce light of substantially the same color. For example, in some embodiments, laser light sources 320 and 330 may both produce red, green, or blue laser light. Laser light sources 320 and 330 produce linearly polarized light beams. For example, laser light source 320 produces a P-polarized light beam at 322, and laser light source 330 produces an S-polarized light beam at 332.

Polarizing beam splitter cube 340 is an example component that is included within light combining apparatus 240 (FIG. 2). Polarizing beam splitter cube receives and combines the polarized light beams at 322 and 332, and produces a combined beam at 342.

In some embodiments, laser light sources 320 and 330 are not simultaneously driven. Rather, they are driven for alternate pixels, lines, or frames. In these embodiments, the S-polarized and P-polarized light are time multiplexed at 342 with a time between transitions being equal to a pixel time, a line time, or a frame time.

Polarization of laser light sources 320 and 330 may be achieved in any manner without departing from the scope of the present invention. For example, in some embodiments, the light sources may be mounted with a physical 90 degree offset. Also for example, in some embodiments, both laser light sources may be mounted with same orientation with one laser light source including a half wave plate to rotate the linear polarization by 90 degrees. For example, in some embodiments, both laser light sources are physically oriented so that they both produce S-polarized light beams, and laser light source 320 includes a half wave plate to rotate the polarization and produce a P-polarized light beam.

Controller 310 may include any suitable hardware and/or software useful to receive commanded light power values and drive drivers 312 and 314. For example, controller 310 may include application specific integrated circuits (ASICs), one or more processors, or the like. Further, controller 310 may include one or more digital-to-analog converters to produce drive currents and/or voltages from digital values. In operation, controller 310, under either hardware or software control, drives drivers 312 and 314 for alternate pixels, lines, and/or frames.

FIG. 3 shows one controller, two drivers, and two laser light sources. In some embodiments, one controller drives n drivers, which in turn drive n laser light sources, where n is equal to the number of laser light sources in the scanning projection apparatus. For example, some embodiments include one controller, six drivers, and six laser light sources: two red, two green, and two blue. In other embodiments, one controller is dedicated to each color of laser light sources. For example, some embodiments include three controllers, six drivers, and six laser light sources, where one controller is dedicated to control each pair of red, green, and blue laser light sources.

Figure 4:
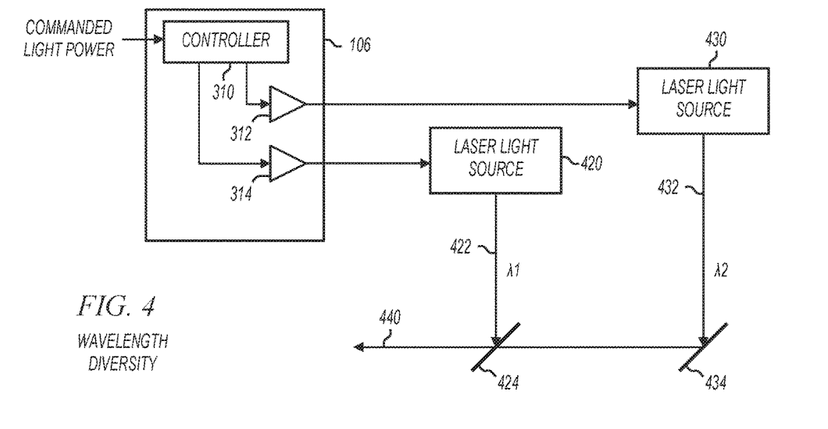
FIG. 4 shows a controller and drivers driving two laser light sources having different wavelengths.

FIG. 4 shows a controller and drivers driving two laser light sources having different wavelengths. Controller and drivers 106 is shown including controller 310 and drivers 312 and 314. Controller 310 receives commanded light power values and drives one or both of drivers 312 and 314. Driver 312 drives laser light source 430, and driver 314 drives laser light source 420.

Laser light sources 420 and 430 produce light of substantially the same color, but at different wavelengths. For example laser light source 420 produces laser light 422 at wavelength λ1, and laser light source 430 produces laser light 432 at wavelength λ2. In some embodiments, laser light sources 420 and 430 may both produce light that is perceived by the human eye as the same color, but the wavelengths λ1 and λ2 differ enough to reduce speckle when spatial overlap occurs. For example, laser light source 430 may produce light having a wavelength of 635 nanometers (nm), and laser light source 420 may produce light having a wavelength of 650 nm. Both produce light that is perceived by the human eye as red, and the wavelength diversity provided by the different wavelengths reduces speckle when there is spatial overlap.

The amount of speckle reduction provided by wavelength diversity depends on multiple factors, including the spectral separation of the two light beams and the characteristics of the projection surface. In some embodiments, when the projection surface characteristics are known or estimated, the wavelengths λ1 and λ2 are chosen for each color such that the difference Δλ1=λ1−λ2 satisfies:

$$\Delta \lambda > \frac{\lambda_0^2}{2\pi n h_0} \quad (1)$$

where $\lambda_0$ is the peak emission wavelength, n is the refractive index of the medium (e.g., air), and $h_0$ is the standard deviation of the heights of the diffusing surface (e.g., the projection surface). Satisfying equation 1 provides decorrelation corresponding to speckle reduction.

Mirror 434 directs the light from laser light source 430 to dichroic mirror 424, which combines the light from the two light sources. Dichroic mirror receives and combines the wavelength diverse light beams at 422 and 432, and produces a combined beam at 440.

In some embodiments, laser light sources 420 and 430 are not simultaneously driven. Rather, they are driven for alternate pixels, lines, or frames. In these embodiments, the light beams at wavelengths λ1 and λ2 are time multiplexed at 342 with a time between transitions being equal to a pixel time, a line time, or a frame time.

FIG. 4 shows one controller, two drivers, and two laser light sources. In some embodiments, one controller drives n drivers, which in turn drive n laser light sources, where n is equal to the number of laser light sources in the scanning projection apparatus. For example, some embodiments include one controller, six drivers, and six laser light sources: two red, two green, and two blue. In other embodiments, one controller is dedicated to each color of laser light sources. For example, some embodiments include three controllers, six drivers, and six laser light sources, where one controller is dedicated to control each pair of red, green, and blue laser light sources.

Some embodiments include both wavelength diversity and polarization diversity. For example, in some embodiments, the characteristics of light sources 320 and 430 are combined, and the characteristics of light sources of 330 and 420 are combined. In these embodiments, speckle is reduced using both wavelength diversity and polarization diversity.

Figure 5:
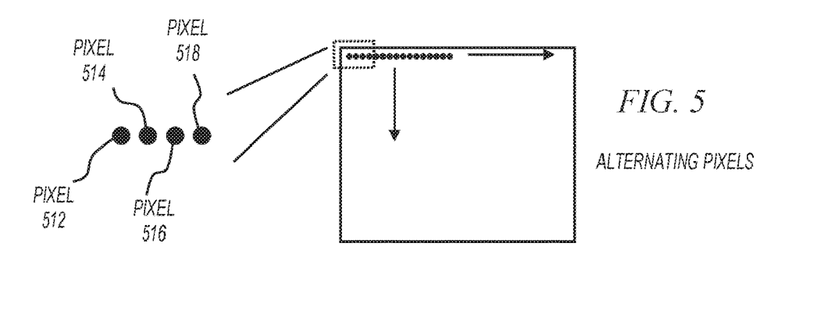
FIG. 5 shows different pixels illuminated by different light sources.

FIG. 5 shows different pixels illuminated by different light sources. Pixels 512, 514, 516, and 518 are shown as representative pixels in a single line of one frame. In some embodiments, controller 310 (FIGS. 3, 4) alternates the light sources used to illuminate successive pixels resulting in alternate pixels being illuminated by alternate light sources. For example, in some embodiments, pixels 512 and 516 are illuminated by laser light source 320 or 420, and pixels 514 and 518 are illuminated by laser light source 330 or 430. In other embodiments, series of consecutive pixels are alternately illuminated by different light sources. For example, in some embodiments, pixels 512 and 514 are illuminated by laser light source 320 or 420, and pixels 516 and 518 are illuminated by laser light source 330 or 430. Any number of pixels may be included in a series without departing from the scope of the present invention.

Speckle reduction is achieved by spatially overlapping laser light beams from different laser light sources. For example, when laser light from source 320 and source 330 are overlapped in space, or when laser light from source 420 and 430 are overlapped in space, speckle reduction is achieved as long as the time separation is not too great for the human eye to average the effects of spatial overlap. Various embodiments of the present invention take advantage of the spatial overlap to achieve $$\frac{1}{\sqrt{2}}$$

speckle reduction across the entire screen. In some embodiments, spatial overlap is achieved by alternating which laser light source is used to illuminate a particular pixel for successive frames. For example, pixel 512 may be illuminated by laser light source 320 or 420 in a first frame, and may be illuminated by laser light source 330 or 430 in a subsequent frame resulting in spatial overlap. In some embodiments, a random or pseudo-random illumination of individual pixels distributed between the two laser light sources may be used to randomize the fixed patterns generated from illuminating a full frame, a full line or a series of pixels. The random pixels illuminated with one laser light source in a first frame are then illuminated with a different laser light source with polarization diversity and/or wavelength diversity in a subsequent frame. In the case of polarization diversity, both S and P polarizations are overlapped in space, and in the case of wavelength diversity, two light beams of different wavelengths are overlapped in space. The random pattern may repeat on a frame by frame basis. In some embodiments, a maximum length sequence (MLS) is used to produce a pseudo-random generation pattern with a controlled period of repetition.

Figure 6:
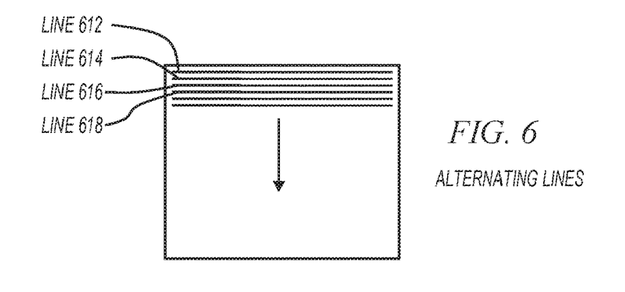
FIG. 6 shows different lines illuminated by different light sources.

FIG. 6 shows different lines illuminated by different light sources. Lines 612, 614, 616, and 618 are shown as representative lines in a single frame. In some embodiments, controller 310 (FIGS. 3, 4) alternates the light sources used to illuminate successive lines resulting in alternate lines being illuminated by alternate light sources. For example, in some embodiments, lines 512 and 516 are illuminated by laser light source 320 and lines 514 and 518 are illuminated by laser light source 330. In other embodiments, series of consecutive lines are alternately illuminated by different light sources. For example, in some embodiments, lines 612 and 614 are illuminated by laser light source 320 or 420, and lines 616 and 618 are illuminated by laser light source 330 or 430. Any number of lines may be included in a series without departing from the scope of the present invention.

In some embodiments, spatial overlap is achieved by alternating which laser light source is used to illuminate a particular line for successive frames. For example, line 612 may be illuminated by laser light source 320 or 420 in a first frame, and may be illuminated by laser light source 330 or 430 in a subsequent frame resulting in spatial overlap. In some embodiments, a random or pseudo-random illumination of individual lines distributed between the two laser light sources may be used to randomize the fixed patterns generated from illuminating a full frame, a full line or a series of pixels. The random lines illuminated with one laser light source in a first frame are then illuminated with a different laser light source with polarization diversity and/or wavelength diversity in a subsequent frame. In the case of polarization diversity, both S and P polarizations are overlapped in space, and in the case of wavelength diversity, two light beams of different wavelengths are overlapped in space. The random pattern may repeat on a frame by frame basis. In some embodiments, a maximum length sequence (MLS) is used to produce a pseudo-random generation pattern with a controlled period of repetition.

Alternating lines provides thermal balancing between the two laser light sources (as compared to alternating frames) which mitigates intensity artifacts at the switching point due to laser efficiency and wavelength shifts with temperature (during cycles of on/off heating/cooling). Alternating lines also helps prevent or reduce possible "frame blinking" image artifacts for the user if the screen is not completely depolarizing or exhibiting some partial reflection, and if the user is looking at the screen from an angle (different from normal).

Figure 7:
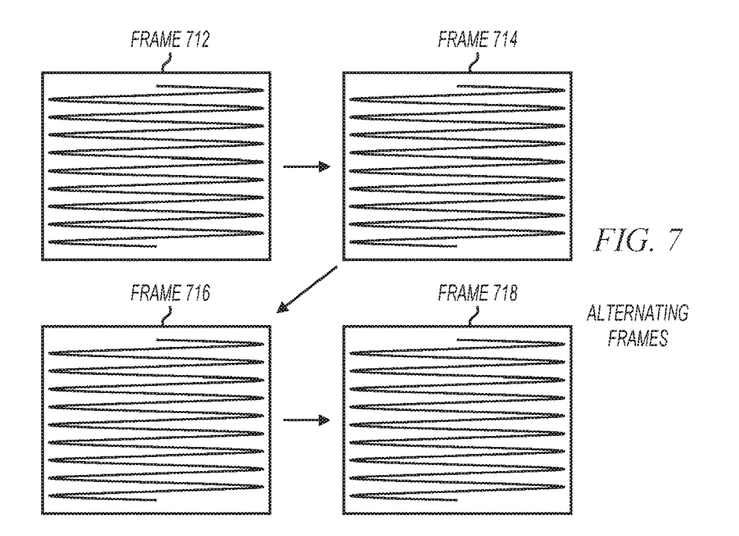
FIG. 7 shows different frames illuminated by different light sources.

FIG. 7 shows different frames illuminated by different light sources. Frames 712, 714, 716, and 718 are shown as representative frames in a sequence of successive frames. In some embodiments, controller 310 (FIGS. 3, 4) alternates the light sources used to illuminate successive frames resulting in alternate frames being illuminated by alternate light sources. For example, in some embodiments, frames 712 and 716 are illuminated by laser light source 320 or 420 and frames 714 and 718 are illuminated by laser light source 330 or 430. In other embodiments, series of consecutive frames are alternately illuminated by different light sources. For example, in some embodiments, frames 712 and 714 are illuminated by laser light source 320 or 420, and frames 716 and 718 are illuminated by laser light source 330 or 430. Any number of frames may be included in a series without departing from the scope of the present invention.

Speckle reduction is achieved by spatially overlapping laser light beams from different laser light sources. For example, when laser light from source 320 and source 330 are overlapped in space, or when laser light from source 420 and 430 are overlapped in space, speckle reduction is achieved as long as the time separation is not too great for the human eye to average the effects of spatial overlap. Various embodiments of the present invention take advantage of the spatial overlap to achieve $$\frac{1}{\sqrt{2}}$$

speckle reduction across the entire screen.

In the case of the 60 Hz frame rate scanning projection apparatus, the laser light sources will operate alternatively with a 30 Hz frequency. The typical integration time for the human eye has been reported to be around 50 milliseconds (ms) and approximately 40 ms for practical illumination and projection situations. Hence, the human eye averages about 3 frames at 60 Hz and will average the speckle pattern generated by both polarizations and/or wavelengths of the two beams. For a full depolarizing screen when polarization diversity is employed, the appeared speckle is reduced in the same fashion as if both lasers were on at the same time.

Figure 8:
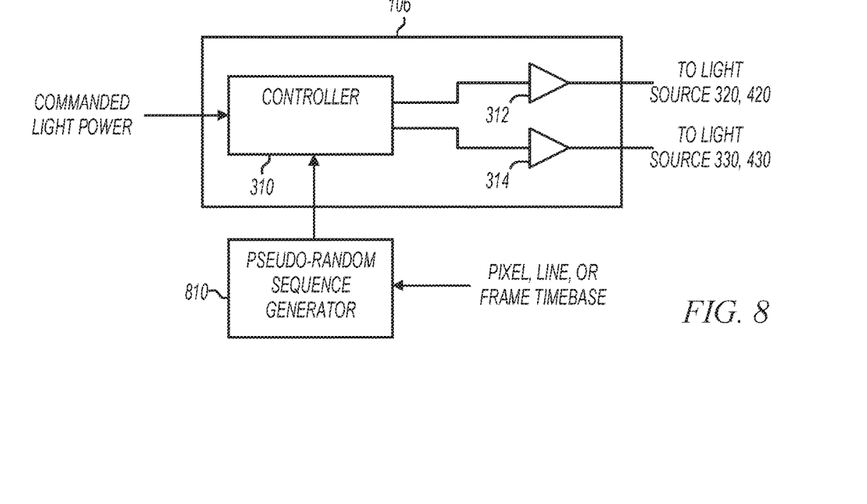
FIG. 8 shows a controller, drivers, and a pseudo-random sequence generator in accordance with various embodiments of the present invention.

FIG. 8 shows a controller, drivers, and a pseudo-random sequence generator in accordance with various embodiments of the present invention. Controller 310 and drivers 312 and 314 are described above with reference to previous figures. Pseudo-random sequence generator 810 produces a pseudo-random sequence and provides that sequence to controller 310. Controller 310 then alternates the use of multiple laser light sources according to the sequence. For example, in some embodiments, pixels, lines, or frames are alternately illuminated by different laser light sources according to the pseudo-random sequence.

Pseudo-random sequence generator 810 may include any circuitry capable of performing the functions described. For example, in some embodiments, pseudo-random sequence generator 810 includes digital circuits such as multipliers, shifters, adders, and logic gates. Also for example, in some embodiments, pseudo-random sequence generator 810 may include hardware circuits and may also include a processor that executes instructions.

Figure 9:
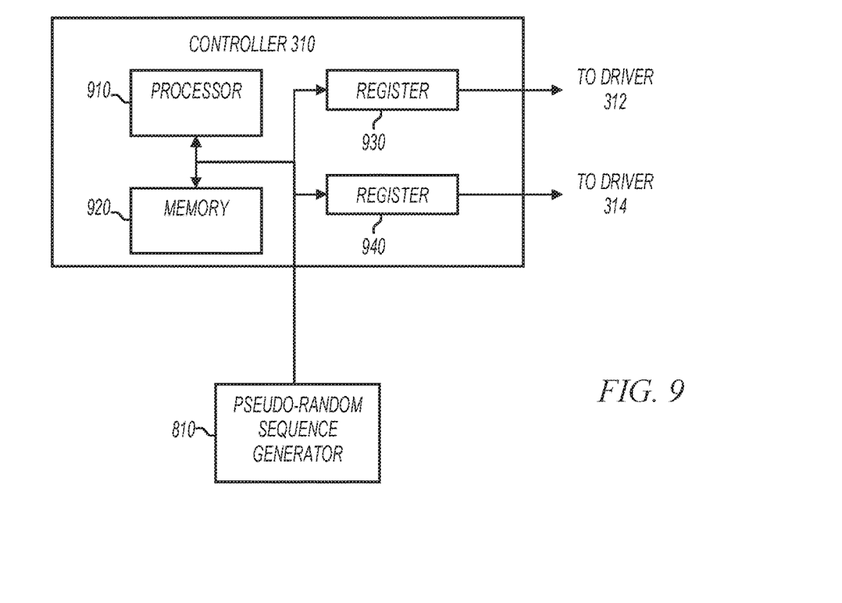
FIG. 9 shows a controller and pseudo-random sequence generator in accordance with various embodiments of the invention.

FIG. 9 shows a controller and pseudo-random sequence generator in accordance with various embodiments of the invention. In embodiments represented by FIG. 9, controller 310 includes a processor 910, memory 920, and registers 930 and 940. In these embodiments, memory 920 is a non-transitory storage medium capable of storing instructions that when executed by processor 910, controller 310 functions as described herein. For example, memory 920 may store instructions that result in processor 910 alternately writing laser light source drive values to registers 930 and 940 on a pixel, line, and/or frame basis. Further, in some embodiments, memory 920 includes instructions that result in processor 910 writing laser light source drive values to registers 930 and 940 responsive to a pseudo-random sequence received from pseudo-random sequence generator 810.

Figure 10:
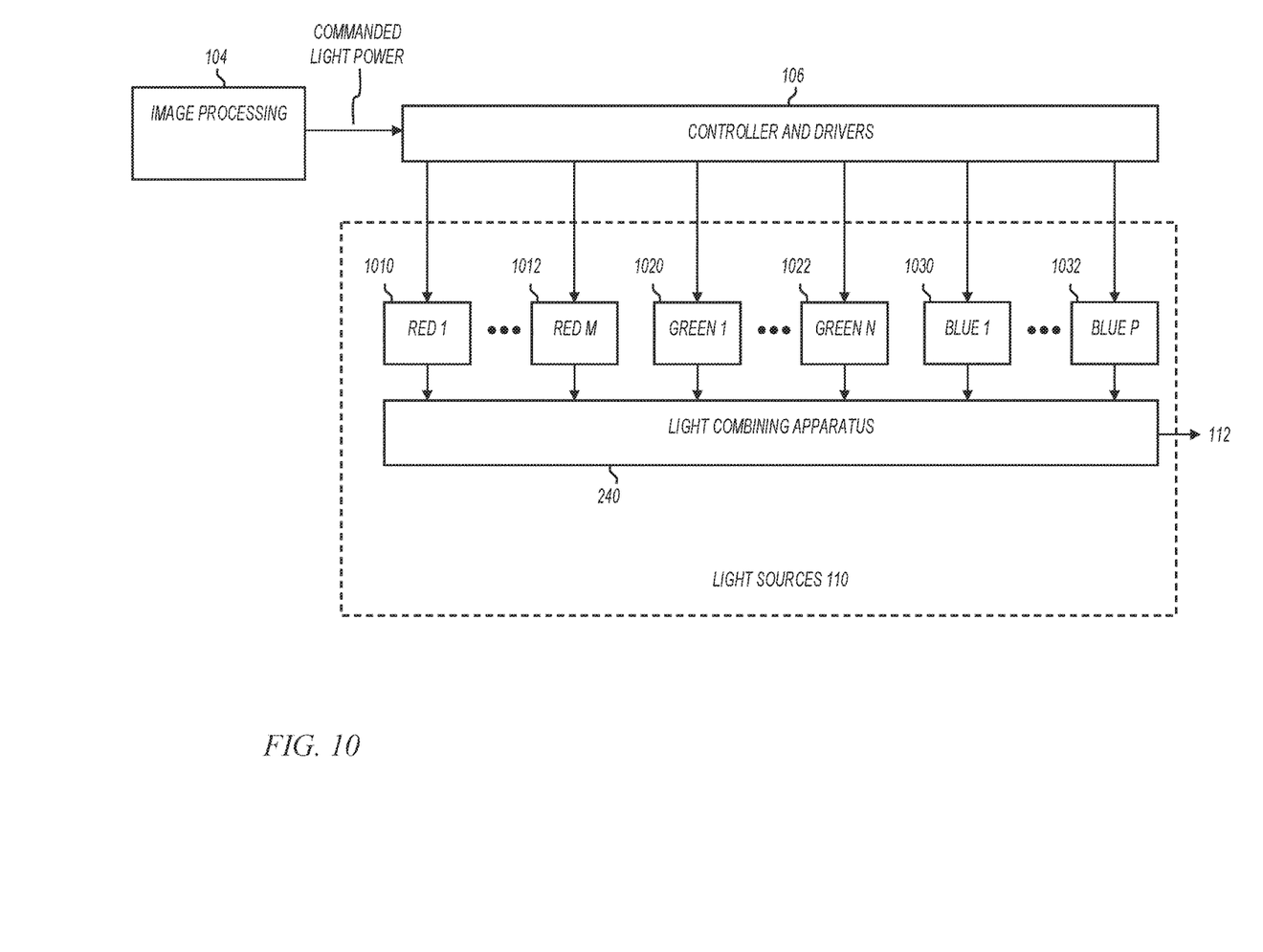
FIG. 10 shows multiple laser light sources that produce light of substantially the same color.

FIG. 10 shows multiple laser light sources that produce light of substantially the same color. FIG. 10 is similar to FIG. 2 with the exception that light sources 110 is explicitly shown with more than two light sources of each color. For example, "M" red light sources are shown starting with red light source 1010 and ending with red light source 1012; "N" green light sources are shown starting with green light source 1020 and ending with green light source 1022; and "P" blue light sources are shown starting with blue light source 1030 and ending with blue light source 1032.

In operation, controller and drivers 106 may alternate the use of M red light sources on a pixel, line, and/or frame basis. Likewise, controller and drivers 106 may also alternate the use of the green and blue light sources on a pixel, line, and/or frame basis. Each of the M red light sources, N green light sources, and P blue light sources may employ polarization diversity and/or wavelength diversity. For example, different ones of the M red light sources may be polarized differently and may emit light of different red wavelengths, different ones of the N green light sources may be polarized differently and may emit light of different green wavelengths, and different ones of the P blue light sources may be polarized differently and may emit light of different blue wavelengths.

Figure 11:
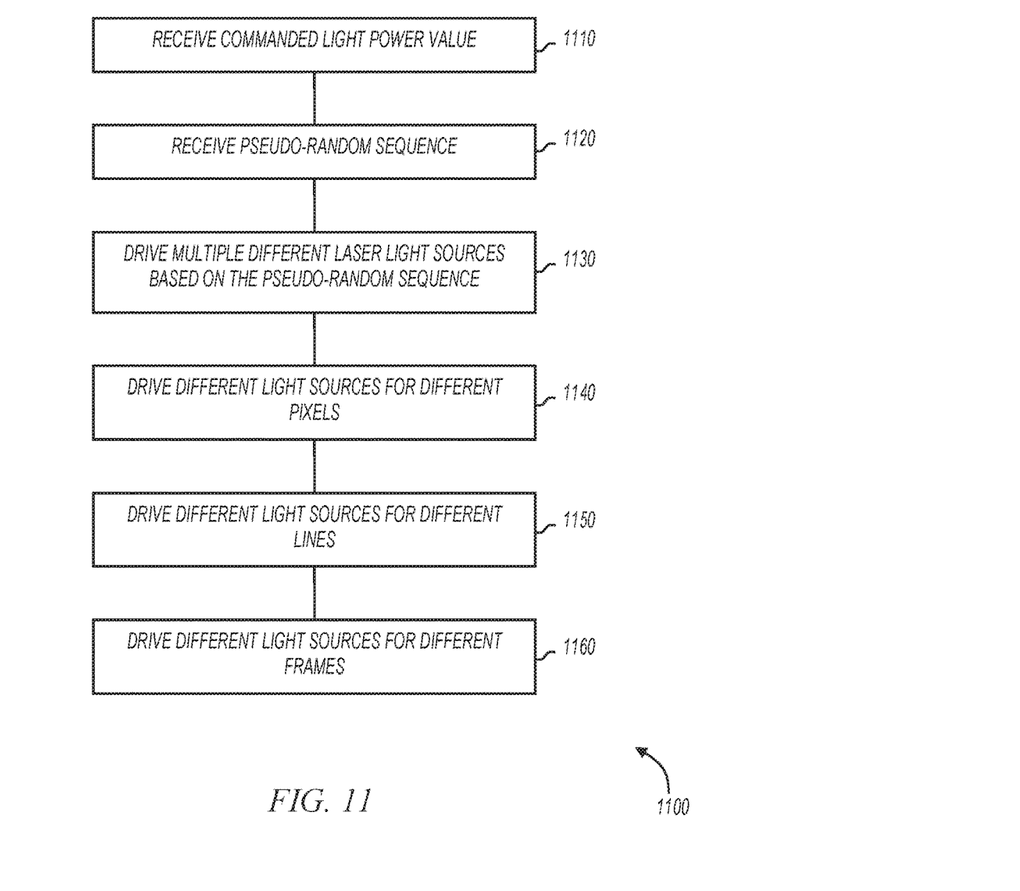
FIG. 11 shows a flowchart of method in accordance with various embodiments of the present invention.

FIG. 11 shows a flow diagram of methods in accordance with various embodiments of the present invention. In some embodiments, method 1100, or portions thereof, is performed by a scanning projection apparatus, embodiments of which are shown in previous figures. In other embodiments, method 1100 is performed by a series of circuits or an electronic system. Method 1100 is not limited by the particular type of apparatus performing the method. The various actions in method 1100 may be performed in the order presented, or may be performed in a different order. Further, in some embodiments, some actions listed in FIG. 11 are omitted from method 1100.

Method 1100 is shown beginning with block 1110 in which a commanded light power value is received. In some embodiments, this corresponds to controller 310 (FIGS. 3, 4) receiving a commanded light power value for one or more colors. At 1120, a pseudo-random sequence is received. In some embodiments, this corresponds to controller 310 receiving a pseudo-random sequence from generator 810.

At 1130, multiple different laser light sources are driven based on the pseudo-random sequence. In some embodiments, the multiple different laser light sources are light sources of substantially the same color. Further, in some embodiments, the multiple different laser light sources have different polarizations to create polarization diversity, and in other embodiments, the multiple different laser light sources have the same polarization. In still further embodiments, the multiple different laser light sources have different wavelengths that are perceived by the human eye as the same color to create wavelength diversity. In still further embodiments, the multiple different laser light sources employ both polarization diversity and wavelength diversity.

At 1140, different light sources are driven for different pixels. For example, successive pixels in a single line may be illuminated by different ones of the multiple different laser light sources having polarization and/or wavelength diversity. Further, the same pixel in subsequent frames may be illuminated by different ones of the multiple laser light sources having polarization and/or wavelength diversity.

At 1150, different light sources are driven for different lines. For example, successive lines in a single frame may be illuminated by different ones of the multiple light sources having polarization and/or wavelength diversity. Further, the same line in subsequent frames may be illuminated by different ones of the multiple laser light sources having polarization and/or wavelength diversity.

At 1160, different light sources are driven for different frames. For example, successive frames may be illuminated by different ones of the multiple light sources having polarization and/or wavelength diversity.

Figure 12:
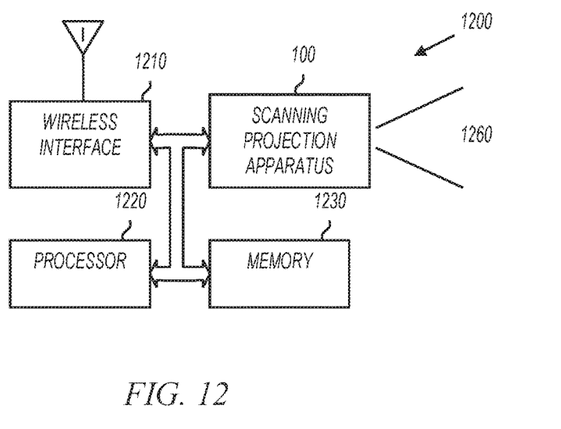
FIG. 12 shows a block diagram of a mobile device in accordance with various embodiments of the present invention.

FIG. 12 shows a block diagram of a mobile device in accordance with various embodiments of the present invention. As shown in FIG. 12, mobile device 1200 includes wireless interface 1210, processor 1220, memory 1230, and scanning projection apparatus 100. Scanning projection apparatus 100 is described with reference to previous figures. In some embodiments, scanning projection apparatus 100 includes multiple laser light sources for producing light at substantially the same color for power savings and speckle reduction as described above. Further, in some embodiments, scanning projection apparatus 100 includes multiple laser light sources having polarization diversity and/or wavelength diversity for speckle reduction as described above.

Scanning projection apparatus 100 may receive image data from any image source. For example, in some embodiments, scanning projection apparatus 100 includes memory that holds still images. In other embodiments, scanning projection apparatus 100 includes memory that includes video images. In still further embodiments, scanning projection apparatus 100 displays imagery received from external sources such as connectors, wireless interface 1210, or the like. Scanning projection apparatus 100 displays the imagery at 1260.

In some embodiments, scanning projection apparatus 100 receives host communications from one or more of processor 1220 or wireless interface 1210, where the host communications influence the determination of how to alternate the use of multiple laser light sources of substantially the same color.

Wireless interface 1210 may include any wireless transmission and/or reception capabilities. For example, in some embodiments, wireless interface 1210 includes a network interface card (NIC) capable of communicating over a wireless network. Also for example, in some embodiments, wireless interface 1210 may include cellular telephone capabilities. In still further embodiments, wireless interface 1210 may include a global positioning system (GPS) receiver. One skilled in the art will understand that wireless interface 1210 may include any type of wireless communications capability without departing from the scope of the present invention.

Processor 1220 may be any type of processor capable of communicating with the various components in mobile device 1200. For example, processor 1220 may be an embedded processor available from application specific integrated circuit (ASIC) vendors, or may be a commercially available microprocessor. In some embodiments, processor 1220 provides image or video data to scanning projection apparatus 100. The image or video data may be retrieved from wireless interface 1210 or may be derived from data retrieved from wireless interface 1210. For example, through processor 1220, scanning projection apparatus 100 may display images or video received directly from wireless interface 1210. Also for example, processor 1220 may provide overlays to add to images and/or video received from wireless interface 1210, or may alter stored imagery based on data received from wireless interface 1210 (e.g., modifying a map display in GPS embodiments in which wireless interface 1210 provides location coordinates).

Figure 13:
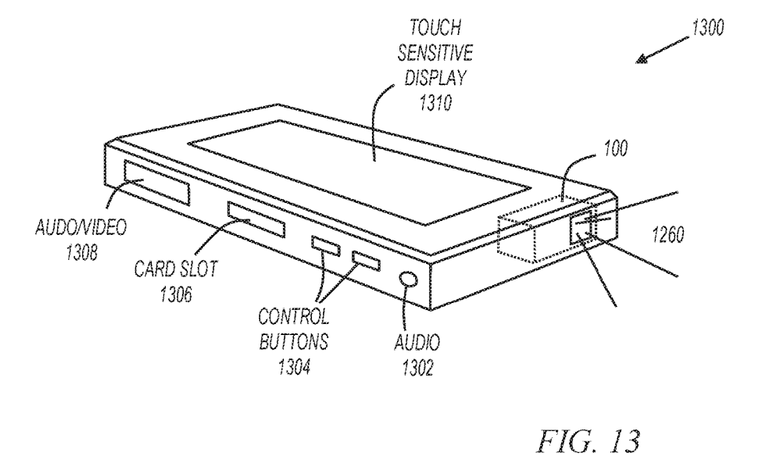
FIG. 13 shows a mobile device in accordance with various embodiments of the present invention.

FIG. 13 shows a mobile device in accordance with various embodiments of the present invention. Mobile device 1300 may be a hand held scanning display system with or without communications ability. For example, in some embodiments, mobile device 1300 may be a scanning projection apparatus with little or no other capabilities. Also for example, in some embodiments, mobile device 1300 may be a device usable for communications, including for example, a cellular phone, a smart phone, a tablet computing device, a global positioning system (GPS) receiver, or the like. Further, mobile device 1300 may be connected to a larger network via a wireless connection (e.g., cellular), or this device can accept and/or transmit data messages or video content via an unregulated spectrum (e.g., WiFi) connection.

Mobile device 1300 includes scanning projection apparatus 100, touch sensitive display 1310, audio port 1302, control buttons 1304, card slot 1306, and audio/video (A/V) port 1308. None of these elements are essential. For example, mobile device 1300 may only include scanning projection apparatus 100 without any of touch sensitive display 1310, audio port 1302, control buttons 1304, card slot 1306, or A/V port 1308. Some embodiments include a subset of these elements. For example, an accessory projector may include scanning projection apparatus 100, control buttons 1304 and A/V port 1308. A smart phone embodiment may combine touch sensitive display device 1310 and scanning projection apparatus 100.

Touch sensitive display 1310 may be any type of display. For example, in some embodiments, touch sensitive display 1310 includes a liquid crystal display (LCD) screen. In some embodiments, display 1310 is not touch sensitive. Display 1310 may or may not always display the image projected by scanning projection apparatus 100. For example, an accessory product may always display the projected image on display 1310, whereas a mobile phone embodiment may project a video while displaying different content on display 1310. Some embodiments may include a keypad in addition to touch sensitive display 1310.

A/V port 1308 accepts and/or transmits video and/or audio signals. For example, A/V port 1308 may be a digital port, such as a high definition multimedia interface (HDMI) interface that accepts a cable suitable to carry digital audio and video data. Further, A/V port 1308 may include RCA jacks to accept or transmit composite inputs. Still further, A/V port 1308 may include a VGA connector to accept or transmit analog video signals. In some embodiments, mobile device 1300 may be tethered to an external signal source through A/V port 1308, and mobile device 1300 may project content accepted through A/V port 1308. In other embodiments, mobile device 1300 may be an originator of content, and A/V port 1308 is used to transmit content to a different device.

Audio port 1302 provides audio signals. For example, in some embodiments, mobile device 1300 is a media recorder that can record and play audio and video. In these embodiments, the video may be projected by scanning projection apparatus 100 and the audio may be output at audio port 1302.

Mobile device 1300 also includes card slot 1306. In some embodiments, a memory card inserted in card slot 1306 may provide a source for audio to be output at audio port 1302 and/or video data to be projected by scanning projection apparatus 100. Card slot 1306 may receive any type of solid state memory device, including for example secure digital (SD) memory cards.

Figure 14:
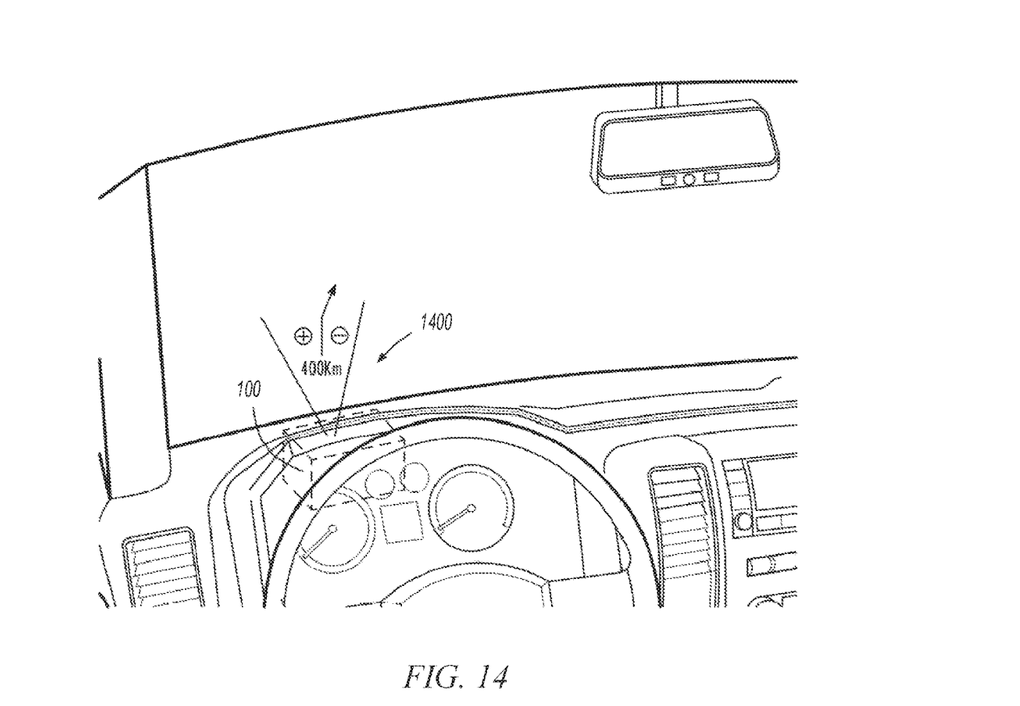
FIG. 14 shows a head-up display system in accordance with various embodiments of the invention.

FIG. 14 shows a head-up display system in accordance with various embodiments of the invention. Scanning projection apparatus 100 is shown mounted in a vehicle dash to project the head-up display at 1400. Although an automotive head-up display is shown in FIG. 14, this is not a limitation of the present invention. For example, various embodiments of the invention include head-up displays in avionics application, air traffic control applications, and other applications.

Figure 15:
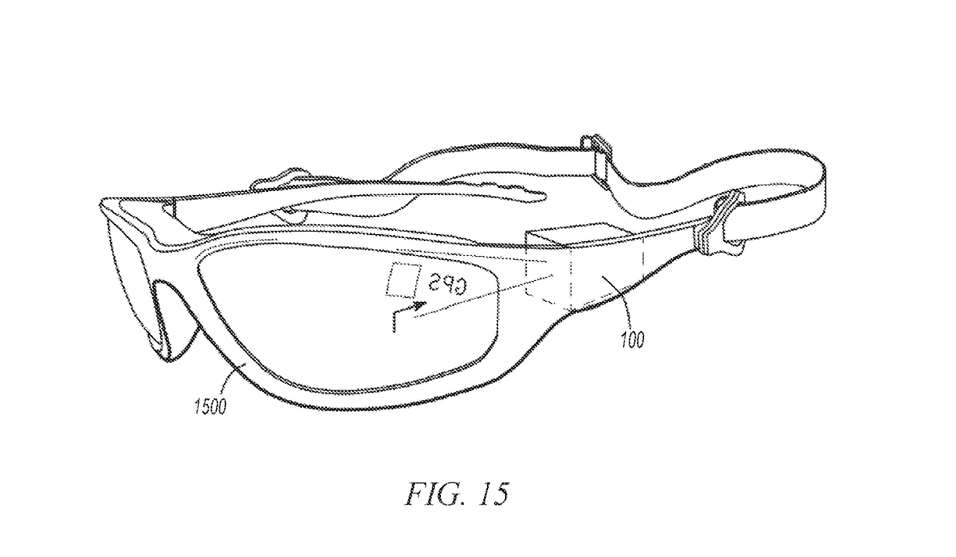
FIG. 15 shows eyewear in accordance with various embodiments of the invention.

FIG. 15 shows eyewear in accordance with various embodiments of the invention. Eyewear 1400 includes scanning projection apparatus 100 to project a display in the eyewear's field of view. In some embodiments, eyewear 1500 is see-through and in other embodiments, eyewear 1500 is opaque. For example, eyewear 1500 may be used in an augmented reality application in which a wearer can see the display from scanning projection apparatus 100 overlaid on the physical world. Also for example, eyewear 1500 may be used in a virtual reality application, in which a wearer's entire view is generated by scanning projection apparatus 100. Although only one scanning projection apparatus 100 is shown in FIG. 15, this is not a limitation of the present invention. For example, in some embodiments, eyewear 1500 includes two scanning projection apparatus; one for each eye.

Figure 16:
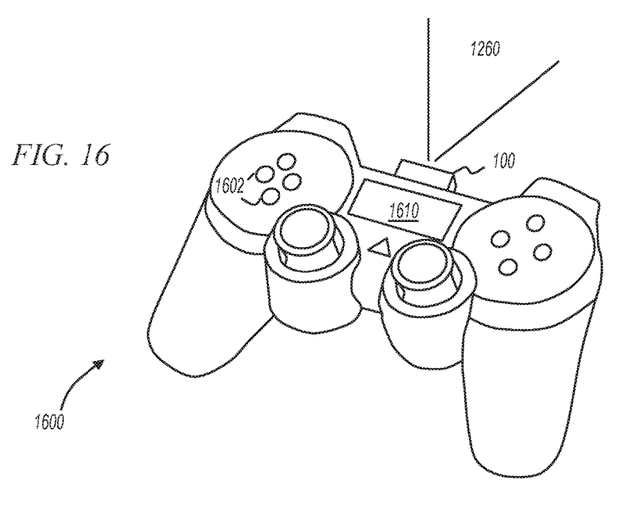
FIG. 16 shows a gaming apparatus in accordance with various embodiments of the present invention.

FIG. 16 shows a gaming apparatus in accordance with various embodiments of the present invention. Gaming apparatus 1600 includes buttons 1602, display 1610, and scanning projection apparatus 100. In some embodiments, gaming apparatus 1600 is a standalone apparatus that does not need a larger console for a user to play a game. For example, a user may play a game while watching display 1610 and/or the projected content at 1260. In other embodiments, gaming apparatus 1600 operates as a controller for a larger gaming console. In these embodiments, a user may watch a larger screen tethered to the console in combination with watching display 1610 and/or projected content at 1260.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A scanning projection apparatus comprising:
   one or more scanning mirrors to reflect a light beam in a medium having refractive index n in a raster pattern to display an image on a projection surface having an estimated standard deviation of heights of $h_0$;
   a plurality of laser light sources that emit light of different wavelengths of substantially the same color to form the light beam, wherein the plurality of laser light sources comprises two laser light sources linearly polarized substantially orthogonal to each other having wavelengths that differ by $$\Delta\lambda > \frac{\lambda_0^2}{2\pi n h_0}$$

where $\lambda_0$ is a peak emission wavelength;
   a polarizing beam splitter positioned to combine light from the two laser light sources to form the light beam; and
   a controller coupled to receive a commanded light output level and to alternately drive the plurality of laser light sources, the controller configured to drive successive ones of the plurality of light sources to illuminate successive pixels in the image.

2. The scanning projection apparatus of claim 1 wherein the controller is configured to drive different ones of the plurality of laser light sources to illuminate a first pixel in successive frames.

3. The scanning projection apparatus of claim 1 further comprising a pseudo-random number generator coupled to the controller, the controller configured to be responsive to the random number generator to determine which of the plurality of laser light sources to drive to illuminate image pixels.

4. A scanning projection apparatus comprising:
   one or more scanning mirrors to reflect a light beam in a medium having refractive index n in a raster pattern to display an image on a projection surface having an estimated standard deviation of heights of $h_0$;
   a plurality of laser light sources that emit light of different wavelengths of substantially the same color to form the light beam, wherein the plurality of laser light sources comprises two laser light sources linearly polarized substantially orthogonal to each other having wavelengths that differ by $$\Delta\lambda > \frac{\lambda_0^2}{2\pi n h_0}$$

where $\lambda_0$ is a peak emission wavelength; and
   a controller coupled to receive a commanded light output level and to alternately drive the plurality of laser light sources, the controller configured to drive successive ones of the plurality of light sources to illuminate successive frames of the image.

5. The scanning projection apparatus of claim 4 further comprising a half wave plate positioned to rotate a polarization of light output from one of the two laser light sources.

6. The scanning projection apparatus of claim 4 wherein the plurality of laser light sources comprises three laser light sources.

7. The scanning projection apparatus of claim 4 further comprising a second plurality of laser light sources that emit light of a second color, wherein the controller is further configured to drive successive ones of the second plurality of laser light sources to illuminate successive frames in the image.

8. A scanning projection apparatus comprising:
   one or more scanning mirrors to reflect a light beam in a medium having refractive index n in a raster pattern to display an image on a projection surface having an estimated standard deviation of heights of $h_0$;
   a plurality of laser light sources that emit light of different wavelengths of substantially the same color to form the light beam, wherein the plurality of laser light sources comprises two laser light sources linearly polarized substantially orthogonal to each other having wavelengths that differ by $$\Delta\lambda > \frac{\lambda_0^2}{2\pi n h_0}$$

where $\lambda_0$ is a peak emission wavelength; and
   a controller coupled to receive a commanded light output level and to alternately drive the plurality of laser light sources, the controller configured to drive successive ones of the plurality of light sources to illuminate successive lines in the image.

9. The scanning projection apparatus of claim 8 wherein the controller is configured to drive different ones of the plurality of laser light sources to illuminate a first line in successive frames.

10. The scanning projection apparatus of claim 8 further comprising a pseudo-random number generator coupled to the controller, the controller configured to be responsive to the random number generator to determine which of the plurality of laser light sources to drive to illuminate lines in the image.

* * * * *